United States Patent [19]
DeLuca et al.

[11] 4,012,096
[45] Mar. 15, 1977

[54] TELEPHONE CONNECTOR BLOCK APPARATUS

[75] Inventors: Paul V. DeLuca, Port Washington; William V. Carney, Valley Stream, both of N.Y.

[73] Assignee: Porta Systems Corporation, Syosset, N.Y.

[22] Filed: June 4, 1975

[21] Appl. No.: 583,781

Related U.S. Application Data

[63] Continuation of Ser. No. 410,449, Oct. 29, 1973, abandoned.

[52] U.S. Cl. .......................... 339/18 R; 179/1 PC; 339/65; 339/150 B; 339/276 A; 361/425
[51] Int. Cl.² ..................... H01R 9/00; H01R 31/08
[58] Field of Search ......... 179/98, 1 PC; 339/17 R, 339/17 C, 18, 19, 65, 66, 113, 114, 150, 151, 155, 157, 198, 214, 222, 276 A; 317/101 CP, 101 CC, 118, 122

[56] References Cited

UNITED STATES PATENTS

| 2,034,273 | 3/1936 | Smith | 339/113 L |
|---|---|---|---|
| 3,320,573 | 5/1967 | Machts et al. | 339/66 R |
| 3,644,792 | 2/1972 | Fields | 339/17 C |
| 3,660,726 | 5/1972 | Ammon et al. | 339/18 B |
| 3,670,207 | 6/1972 | Seabury | 339/18 C |
| 3,670,296 | 6/1972 | MacKenzie, Jr. | 339/198 H |
| 3,740,697 | 6/1973 | Van Son | 339/276 A |

FOREIGN PATENTS OR APPLICATIONS

| 735,641 | 9/1932 | France | 339/18 R |
|---|---|---|---|
| 2,013,118 | 9/1971 | Germany | 339/113 R |
| 988,225 | 4/1965 | United Kingdom | 339/19 |

Primary Examiner—Roy Lake
Assistant Examiner—Neil Abrams
Attorney, Agent, or Firm—Philip D. Amins

[57] ABSTRACT

An improved connector block comprises a molded main body portion having test pin and connection-effecting pin couplet fields orthogonally disposed therein. In service, as on a telephone central office main distributing frame, the block receives and terminates two wire groups (e.g., subscriber lines and switching equipment conductors), selectively establishing connections therebetween via couplet pin joining plug connectors. Internal conductors connect each cross connection implementing pin couplet to an appearance in the test pin field.

The connector block assembly reliably effects circuit interconnections employing minimal wire wrap junctions; may be readily and relatively inexpensively constructed; and may be flexibly and efficiently installed and utilized.

22 Claims, 5 Drawing Figures

TELEPHONE CONNECTOR BLOCK APPARATUS

This is a continuation of application, Ser. No. 410,449 filed Oct. 29, 1973; now abandoned.

DISCLOSURE OF INVENTION

This invention relates to telephony apparatus and, more specifically, to an improved connector block and method for connector block fabrication.

It is an object of the present invention to provide improved connector block apparatus.

More specifically, an object of the present invention is the provision of connector block apparatus which effects flexible and reliable wire path interconnections; which facilitates circuit connections, and connection testing and interruption; and which may be simply and inexpensively fabricated.

The above and other objects of the present invention are realized in a specific, illustrative modular connector block arrangement - employed, for example, on a telephone central office main distributing frame, to connect subscriber cable pair to central office switching equipment. Other employment of connector block apparatus in central office (or other) installations is well known to those skilled in the art.

The connector block comprises a relatively thin, rectangular main body portion having test and cross connection conducting pin fields disposed orthogonal thereto. The cross connection field comprises associated pin couplets each formed of one pin which projects beyond both side surfaces of the main body portion, the other projecting past only one side thereof.

The two equipment lines to be selectively joined at a particular connector block connection point (e.g., a subscriber tip conductor and the corresponding central office switch equipment lead) pass through preassigned apertures in fanning strips disposed on the respective rear side of the block, and terminate on differing ones of the pin couplet. The connection therebetween is then selectively effected by inserting a pin into a connecting plug connector in a connector-receiving aperture field therefor to electrically interconnect the two pins, and thereby the equipment lines.

Structure within the main connector block main body portion connects each pin couplet to a test pin appearance in the test field for test purposes. Moreover, each pin-connector plug includes an aperture in the periphery thereof for making electrical contact with the pin couplet for test purposes.

The advantages obtaining from the instant connector block arrangement are many, and only briefly summarized here. They may be more fully gleaned from the detailed presentation below. Principally, the block provides for reliable line interconnection, dependent upon only a minimal number of connections (four) at each block location, viz., termination of the two incoming wires, and a switching point to make or break the connection. Then also, the connector block may be readily and relatively inexpensively fabricated, requiring relatively few operations - and is amenable to printed circuit board construction. In addition, the connector block is compact and efficient in the space consumed per line connection; facilitates wire wrap line connections thereto; and may be readily and flexibly installed.

The above and other features and advantages of the present invention will become more clear from the following detailed description of an illustrative embodiment thereof, presented hereinbelow in conjunction with the accompanying drawing, in which.

Figure 1:
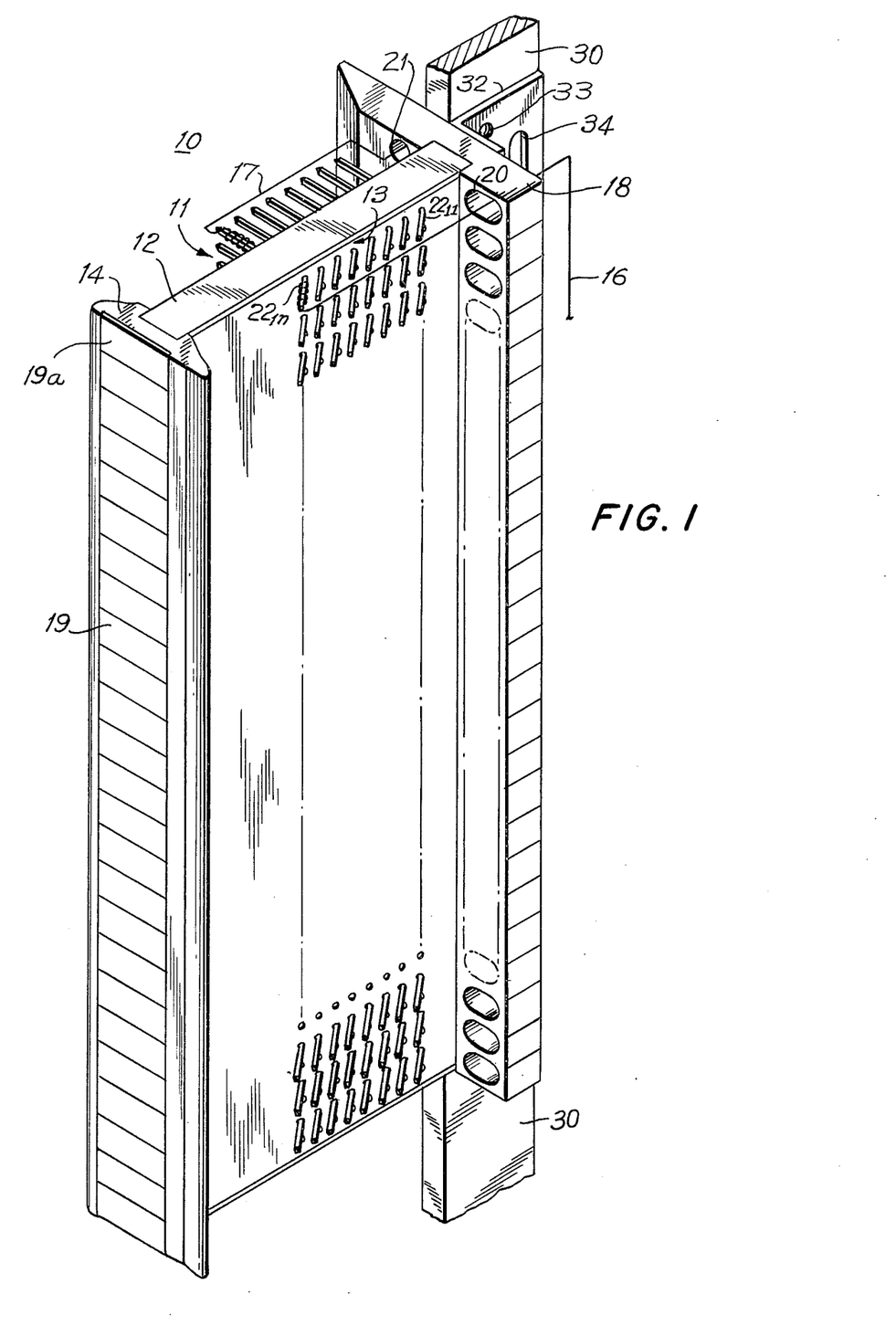
FIGS. 1 and 2 are right and left side isometric views of installed connector block apparatus illustrating the principles of the present invention.
Figure 2:
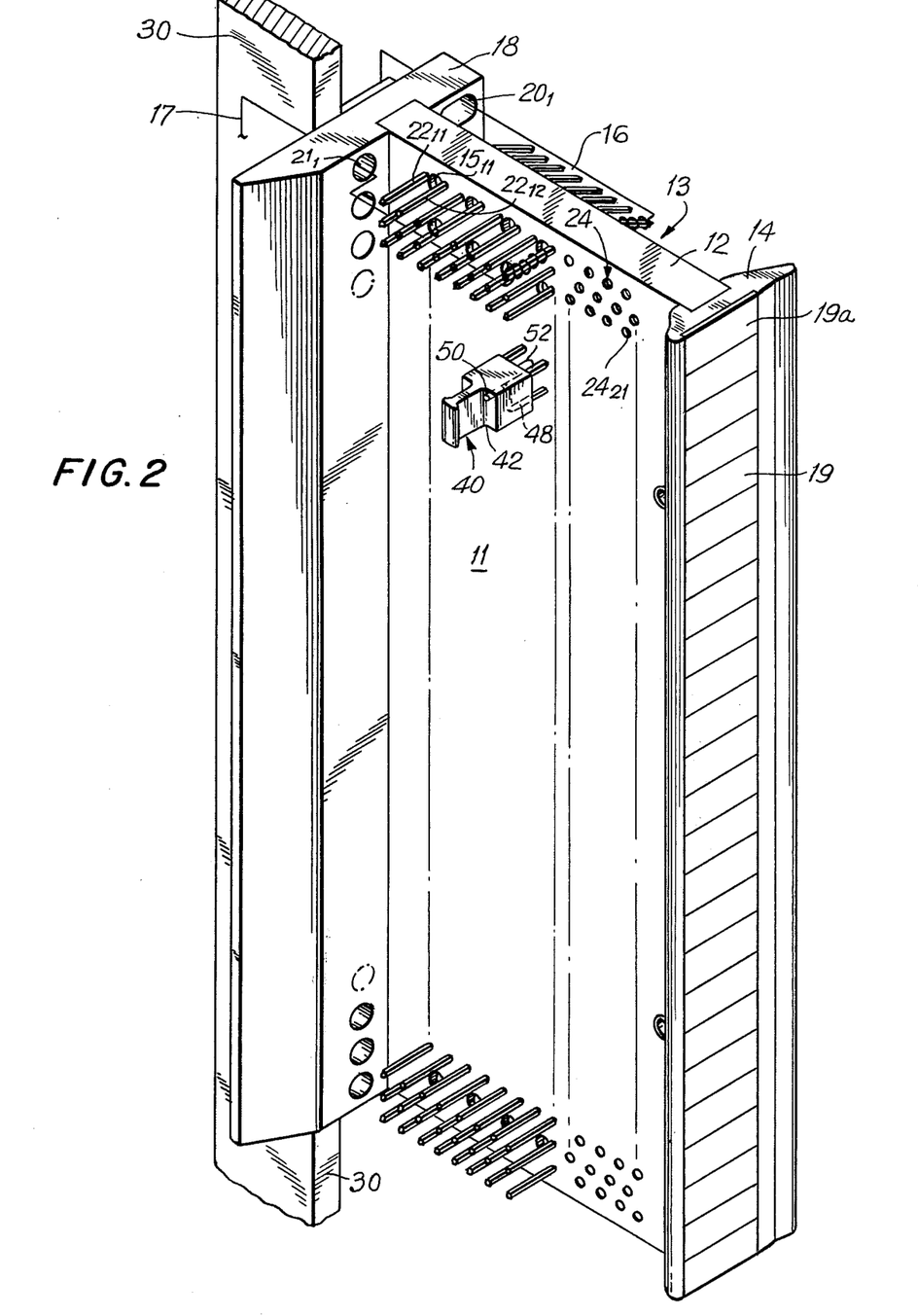

Referring now to FIGS. 1 and 2, there is shown improved connector block apparatus 10 embodying the principles of the present invention. In a telephony context, the connector block 10 is typically secured to some frame equipment 30 in a central office, e.g., a main distributing frame, and is utilized to selectively interconnect two groups of conductors. Thus, for example, on a vertical main distributing frame installation, the block 10 may terminate at one side thereof (e.g., the left side in the arrangement of FIGS. 1 and 2) wires from a vault associated with subscriber pair, terminating at the other (right) side thereof conductors leading to central office switching equipment. As a general proposition, it will be understood by those skilled in the art that the connector block apparatus 10 may be employed to effect any type of cable interconnections for any cross-connection purposes whatever, operating upon any of, or any combination of subscriber lines, switching lines, trunks, or the like.

The connector block 10 includes a main connector body portion 12 (e.g., of molded thermoplastic) having a principal enclosure part 11 and a cover face 13. Secured to the front edge of the main connector block body portion 12 is a molded plastic element 14 including a strip 19 having a graphic card presenting plural segments 19a for visually displaying the identity or address of the conductors connected to the corresponding portion of the connector block. Similarly, secured to the rear section of the connector block main body portion 12 is a molded plastic element 18 which includes fanning apertures 20 and 21 disposed on differing sides of the element 12. As a general matter, incoming ones of the cabling to one face of the connector block are subdivided and pass through that one of the series of apertures 21 closest to the termination of each cable lead destined for the face 11 of the connector block body member 12, while the apertures 20 are similarly employed to distribute incoming wires of the second cabling group terminating at the connector block 10 face 13. For purposes of preserving the clarity of the drawing only one wire 17 terminating at the face 11 and passing through a first fanning aperture $21_1$, and a single wire 16 terminating on the connector block right side via an upper fanning aperture $20_1$ are shown in the drawing. It will be appreciated that, in actual service, a number of wires in fact pass through each of the apertures 20 and 21. Thus, for example, in a connector block adapted to terminate two groups of 200 wires each at terminating points arranged in a 25 × 8 matrix, 25 fanning apertures 20 and 21 may be employed, eight wires passing through each such aperture. The apertures 33 are utilized to secure the connector block mounting member 32 to the frame equipment 30 while the apertures 34 are used for mounting of cable clamp members.

Disposed orthogonal to the connector main body member 12 are two fields of conducting pins, viz., a field of cross connection pins 22, and a test pin field 24, the test pin field providing ready access (as for a test shoe) for testing individual ones or groups of the line interconnections established by the composite connector block organization 10.

The circuit cross connection establishing pins 22 employ an aggregate of $2 \cdot n$ pins (all projecting through the left face 11 of the connector block member 12) to establish $n$ interconnections, $n$ being any integer. One half ($n$) of $2 \cdot n$ pins project through and out of the connector block body member 12 to the right side thereof and form the termination lugs for receiving the conductor group passing through the fanning apertures 20. It will be appreciated that any type of connections may be made but, for convenience and in accordance with the preferred mode for practicing the present invention, wire wrap connections are employed. For convenience of access, the projecting portions of the pins 22 on the right face thereof are bent forward to facilitate access thereto from the front of the connector block. For purposes discussed below in conjunction with the test pins 24, the other one half ($n$) of the pins 22 terminate in the interior of the connector block body portion 12. Thus, for the 200 connection connector block matrix organization identified above, 400 pins 22 appear on the left side of the block (viewed from the front), while only 200 of these pins continue through and project beyond the right side of the block.

Associated leads from the two conductor groups which terminate at the connector block, i.e., each two wires to be joined by the connector block 10, terminate at vertically contiguous pins 22. Expressed in the mathematical matrix notation as reflected by the drawing, the conductor at the left of the connector block will terminate at a pin $22_{i,j}$ while the conductor at the right side to be selectively connected thereto terminates at a pin $22_{i-1,j}$. The pins $22_{i,j}$ and $22_{i-1,j}$ will then be selectively interconnected by one half of a plugable connector 40 (more particularly depicted in FIG. 5) which includes a jumper connection 48 for electrically joining the two pins. Only one block 40 is shown in FIG. 2 for purposes of clarity, but it will be appreciated that, in general, a multi-element array of such plugs 40 will be disposed on the left face 11 of the connector block body portion 12.

It is observed at this point that the molded connector block body portion 12 includes an array of apertures 15 for receiving a plug 40 positioning projection 54 (see FIG. 5) therein. Thus, to interconnect the wires 16 and 17 shown in FIGS. 1 and 2, the wire 16 terminates on the pin $22_{11}$ (right side), and the conductor 17 terminates at the pin $22_{21}$ (left side). A plug 40 is then simply inserted in an aperture $15_{11}$ (between pins $22_{11}$ and $22_{12}$) such that a biased jumper conductor 48 in the plug 40 (see FIG. 5) interconnects the pins $22_{11}$ and $22_{21}$, thereby also connecting the cabling 16-17.

Further in this regard, it is noted (see FIG. 5) that the block 40 has a molded projecting portion 52 wider in diameter than the portion 54. The length of the element 52 effectively acts as a spacer, establishing the operational distance between the bottom flat of an inserted plug 40 and the surface of the connector body element 11. The spacing is made sufficiently large such that it does not interfere with the wire wrap termination of the conductor 17.

As above noted, each pin coupled $22_{i,j}$, $22_{i-1,j}$ is connected to an associated pin 24 of a test pin array 24. This permits electrical testing of the potential of the wire connection path effected by the aforementioned pins 22 and the leads connected thereto, by simply attaching an electrical probe to the particular test point pin 24. As is also common practice in the telephony art, a test shoe with a plurality of electrically independent spring biased contact pins may be clamped over a portion or all of the test point field 24 to automatically and/or simultaneously monitor the electrical potentials persisting at a plurality of circuit connection stations. Further with respect to block testing, it is observed (see FIGS. 1, 2 and 5) that the block plug connectors 40 include two aperture channels $50_a$ and $50_b$ through which electrical probes may be inserted to check potentials directly at the connection point - all testing discussed above thus being permissible without disturbing the jumper interconnection effected by the plug 40 and without requiring unwieldy resort to the limited portion of the pins 22 exposed beneath the bottom flat of a plug 40.

Figure 3:
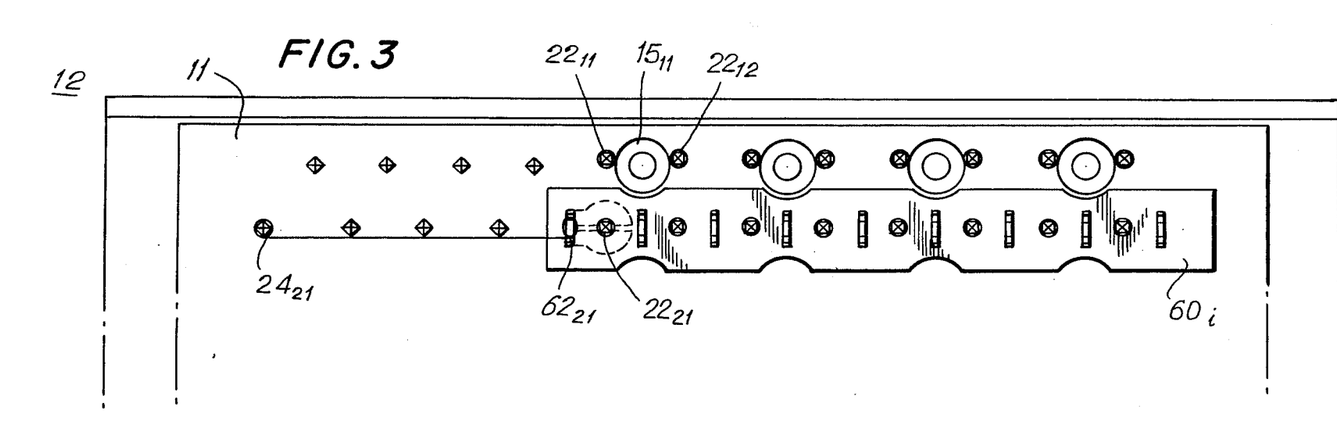
FIG. 3 is a plan view of the interior of the connector block apparatus depicted in FIGS. 1 and 2.

Turning now to FIG. 3, there is shown an interior view of the main connector block body member 12 looking toward the portion 11 thereof from the inside. This figure more particularly illustrates the manner in which connections are made between the connector pin couplets 22 and the corresponding test point pin 24, e.g., the pin $22_{i,j}$ and a corresponding dedicated pin $24_{i,j}$ in the test field. With respect to FIG. 3, it is observed that those $n$ pins 22 extending beyond both sides 11 and 13 of the block body member 12 are disposed in alternate (e.g., odd numbered) rows and include therebetween the aperture - wells 15 for receiving the mechanical projection 54 of the connector plugs 40.

Figure 4:
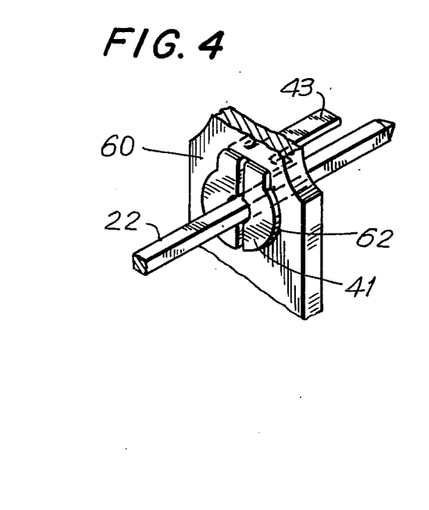
FIG. 4 illustrates pin seizing apparatus included in the structure of FIG. 3.

Passing through the molded connector member 11 in the even numbered rows are the $n$ short pins $22_{i,j}$ each directly below the associated couplet pin $22_{i-1,j}$. The interior end portion of each pin $22_{i,j}$ is engaged by an electrical contact element $62_{i,j}$ associated with a particular nonconducting circuit board strip $60_i$. As more particularly shown in FIG. 4, the structure 62 may comprise a bifurcated contact portion 41 with a central aperture for electrically seizing and engaging the pin $22_{i,j}$ passing therethrough, and an orthogonally extending lug portion 43 which projects upward and above the surface of the board $60_i$. An electrical connection is then made between the lug portion 43 and the interior end portion of the desired test pin $24_{i,j}$. In the particular embodiment shown in the example, the electrical connection between the elements $62_{i,j}$ and $24_{i,j}$ is by a separate wire conductor having wire wrap connections at both ends thereof, and the boards $60_i$ are shown as being independent of one another. It may be observed, however, that the boards 60 may comprise one or more printed circuit boards through which the pins 24 and 22 project such that the connection therebetween may be by plating on the printed circuit board rather than by separate wiring.

It is observed at this point that the electrical connection between each two associated wires to be connected by the composite FIG. 1 assembly is reliable and employs a minimal number of interface connection points - the typical failure mechanism for connector block connections. As inescapably required, two connections are required to terminate each of the incoming wires 16 and 17. The only other connections required to establish a complete circuit path between the wires 16 and 17 is that provided by a conducting clip 48 in the corresponding plug connector 40. It is observed that any failure associated with an electrical connection to a test point does not interrupt the actual telephony circuit path $16$-$22_{11}$-$48$-$22_{21}$-$17$.

Figure 5:
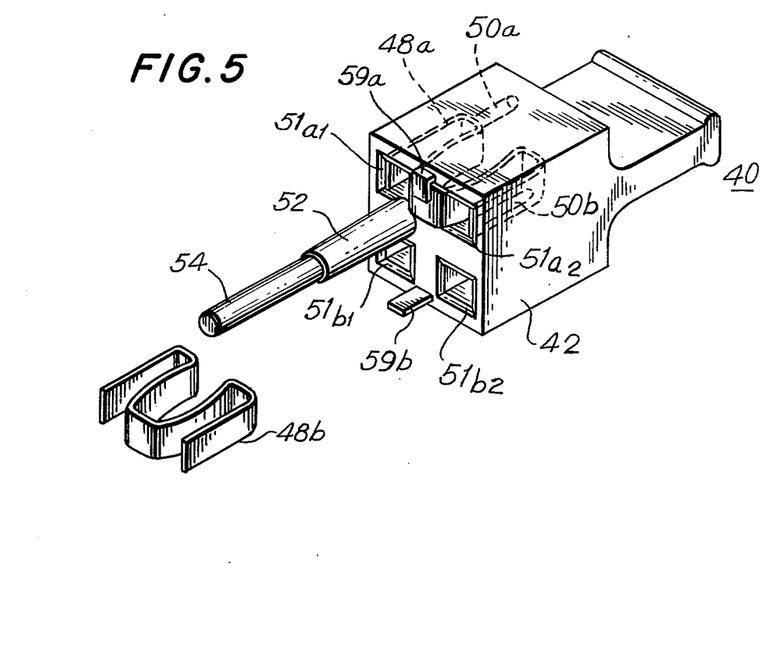
FIG. 5 illustrates connector plug apparatus used for the instant connector block arrangement.

Finally, reference is made to FIG. 5 which discloses a particular embodiment of a plugable pin connector assembly 40 discussed in detail above. To reiterate only briefly, each plug 40 includes a body portion 42 having an eccentrically located nonconducting projecting portion 52 and a further mechanical projection 54 of smaller diameter. The plug portion 54 resides within an aperture-well 15 to provide mechanical support for an inserted plug connector. It is observed that any pressure or torque applied or experienced by a plug 40 will be absorbed by the structure 54-52-42, and will not be passed along to, or experienced by the particular pins 22 to which the plug is connected - the pins 22 typically being much less sturdy and smaller in girth than the plug.

Each plug 40 includes a first pair of pins $22_{i,j}$, $22_{i-e,j}$ receiving apertures $51_{a2}$ and $51_{a1}$, and a corresponding second pair of apertures $51_{b2}$ and $51_{b1}$ for receiving a second pin couplet $22_{i,j+l}$, $22_{i-l,j+l}$. Inserted in each pair of apertures $51_{a,b}$ is an electrical jumper member 48 which includes, for each aperture 51, a pair of inwardly, projecting surfaces for tightly engaging a pin 22 inserted therebetween. When formed, e.g., molded, the plug body 42 includes two lip members 59 which initially permit insertion of the conductor member 48 (see the lip 59b in FIG. 5), and which may be permanently secured over an inserted jumper element 48, as by an application of heat to permanently retain the element 40 thereunder (see lip 59a in FIG. 5).

The above arrangement has thus been shown to provide reliable interruptable interconnections between two groups of conductors which may be cross connected thereby. The arrangement is highly efficient and permits a great number of connections for the volume consumed. The connections are reliably made, contacts necessary for the principal telephony conduction path being kept to a minimum; and the equipment is physically disposed for easy installation in any desired physical attitude or orientation.

The above described arrangement is merely illustrative of the principles of the present invention. Numerous modifications and adaptations thereof will be readily apparent to those skilled in the art without departing from the spirit and scope of the present invention. For example, the projecting portion 54 of the plug connectors 40 may be metallic and a ground plane disposed in the interior of the connector block such that the element 54 electrically contacts the ground plane (which is electrically connected to the central office ground, as via the distributing frame itself). For such a configuration, a voltage transient absorbing element - well known per se to those skilled in the telephony art, may be employed to selectively connect the pins 22 and pin jumper element 48 to ground to absorb transients. Then also, the plugs 40 may include the heat coils in a manner serially disposed in the principal conduction path established thereby for purposes well known.

It will also be apparent to those skilled in the art that the male and female connector portions on the block may be reversed. Still further, wire protecting troughs may be employed to cover the conductors wire wrapped to any row of pins. The pins (at connector block face 11) project through the trough cover, the plugs 40 thus being disposed above the trough while the wires connected to a pin row are disposed therein. The wires are thus protected against straying into the path of a pin projection 52 which might sever such a wire.

What is claimed is:

1. In combination in a connector block, a connector block body member, a plurality of interconnection stations on said block, each of said interconnection stations comprising a pair of pins secured transverse to said body member in said body member, said pair of pins projecting beyond one side of said body member, conductors on both sides of said body member attached to selected ones of said pair of pins, said conductors being directed to locations spaced from said connector block, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pair of pins at said interconnection station to selected ones of said test pin members, at least one plug connector member including at least two recesses therein and electrical conductor means disposed within said recesses for selectively electrically interconnecting said pair of pins at said interconnection station, and said recesses receiving said pair of pins in detachable mating relationship.

2. A combination as in claim 1, wherein the body of said plug connector member includes means for engaging said electrical conductor means for retaining the same within said recesses.

3. A combination as in claim 1 wherein
said plug connector member has at least one aperture therein, said aperture extending between the exterior of said plug connector member and said electrical conductor means.

4. A combination as in claim 1, further comprising first and second fanning strip members disposed on alternate sides of said connector block body member.

5. A combination as in claim 1, further comprising a mounting member affixed to said connector block body member, said mounting member including first plural apertures for mounting said connector block, and second apertures for mounting cable clamp members.

6. A combination as in claim 1, further comprising means disposed about a front portion of said body member and generally orthogonal thereto for displaying identification information.

7. In combination in a connector block, a connector block body member, a plurality of interconnection stations on said block, each of said interconnection stations comprising a pair of pins secured transverse to said body member in said body member, said pair of pins projecting beyond the other side of said body member, test pin members secured within said connector block body member, each of said test pin members being associated with only one of said interconnection stations for enabling selective testing of said interconnection stations, test connection means disposed in the interior of said connector block body member for electrically connecting selected ones of said pair of pins at said interconnection station to selected ones of said test pin members, at least one plug connector member including at least two recesses therein and electrical conductor means disposed within said recesses for selectively electrically interconnecting said pair of pins at said interconnection station, and said recesses receiving said pair of pins in detachable mating relationship.

8. A combination as in claim 7, wherein
said pins at said interconnection station are capable of being removed and replaced without affecting said test connection means.

9. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pair of pins at said interconnection station to selected ones of said test pin members, at least one plug connector member including at least two recesses therein and electrical conductor means disposed within said recesses for selectively electrically interconnecting said pair of pins at said interconnection station, said recesses receiving said pair of pins in detachable mating relationship,
said connector block body member including an aperture-well eccentrically disposed at each pair of interconnection stations, and wherein each of said plug connector members comprises an eccentrically disposed projecting portion thereof for matingly engaging said aperture-well for selective predetermined electrical interconnection of said pin pairs.

10. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pairs of pins at said interconnection stations to selected ones of said test pin members, at least one plug connector member including at least two recesses therein and electrical conductor means disposed within said recesses for selectively electrically interconnecting one of said pair of pins at one of said interconnection stations, said connector block body member including an aperture-well eccentrically disposed at each pair of interconnection stations, each of said plug connector members comprising an eccentrically disposed projecting portion thereon for matingly engaging said aperture-well for selective predetermined electrical interconnection of said pin pairs, said projecting portion comprising a proximal end and a distal end, said proximal end cross-section being larger than said distal end cross-section, and said plug connector members having an inner face which is spaced from said one side of said body member a distance equal to the length of said proximal end.

11. A combination as in claim 10, wherein
selected ones of said pins in selected ones of said pin pairs have wire-wraps on that portion thereof disposed between said inner face of said plug connector and said one side of said body member.

12. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, conductors on both sides of said body member attached to selected ones of said pair of pins, said conductors being directed to locations spaced from said connector block, test pin members secured within said connector block body member, each of said test pin members being associated with only one of said interconnection stations for enabling selective testing of said interconnection stations, test connection means for electrically connecting selected ones of said pairs of pins at said interconnection stations to selected ones of said test pin members, at least one plug connector member including at least two recesses therein and electrical conductor means disposed within said recesses for selectively electrically interconnecting one of said pair of pins at one of said interconnection stations, and said plug connector member having an inner face which is spaced a predetermined distance from said one side of said body member.

13. In combination in a connector block, a connector block body member, a plurality of interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pairs of pins at said interconnection stations to selected ones of said test pin members, at least one plug connector member including at least two recesses therein and electrical conductor means disposed within said recesses for selectively electrically interconnecting one of said pair of pins at one of said interconnection stations, and said ones of said pins projecting beyond said other side of said body member being bent generally forward with respect thereto.

14. A combination as in claim 13, wherein
the other ones of said pair of pins terminate in the interior of said connector block body member.

15. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pair of pins at said interconnection station to selected ones of said test pin members, at least one plug connector member including at least two recesses therein and electrical conductor means disposed within said recesses for selectively electrically interconnecting said pair of pins at said interconnection station, said recesses receiving said pair of pins in detachable mating relationship, said connector block body member including an aperture-well eccentrically disposed at each interconnection station, and wherein each of said plug connector members comprises an eccentrically disposed projecting portion thereon adapted to matingly engage said aperture-well for selective predetermined electrical interconnection of said pin pairs.

16. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pair of pins at said interconnection station to selected ones of said test pin members, at least one plug connector member including at least two recesses therein and electrical conductor means disposed within said recesses for selectively electrically interconnecting said pair of pins at said interconnection station, said recesses receiving said pair of pins in detachable mating relationship, and wherein said electrical conductor means in said plug connector members comprises, in each of said recesses, inwardly mechanically biased conductor members.

17. A combination as in claim 16, wherein said plug connector member includes transient responsive members.

18. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pairs of pins at said interconnection stations to selected ones of said test pin members, at least one plug connector member including at least two recesses therein and electrical conductor means disposed within said recesses for electrically interconnecting a selected one of said pair of pins at said interconnection stations, each of said interconnection stations further comprising one of said test pin members secured within said connector block body member, test connection means disposed in the interior of said body member for electrically connecting one of said pins at said interconnection station to one of said test pin members, said test connector means further comprising a board having pin members from a plurality of said interconnection stations passing therethrough, electrical contacting clip members having a projecting portion thereon and a contact portion for engaging one of said last mentioned pin members, means for connecting said projecting portion of said contacting clip means with said test pin members, first and second fanning strip members disposed on alternate sides of said connector block body member, a mounting member affixed to said connector block body member, said mounting member including first plural apertures for mounting said connector block, second apertures for mounting cable clamp members, means disposed about a front portion of said body member and generally orthogonal thereto for displaying identification information, wherein one of said pair of pins at each interconnection station projects beyond both sides of said body member, one of said projecting portions of said pin being bent generally forward with respect to said body member, the other of said pins terminating in the interior of said connector block body member, said connector block body member including an aperture-well eccentrically disposed at selected ones of said interconnection stations, each of said plug connector members comprising an ecentrically disposed projecting portion thereon, said electrical conductor means in said plug connector member comprising, in each of said recesses, inwardly mechanically biased conductor members, and said plug connector members including transient responsive members.

19. In combination in a connector block, a connector block body member, a plurality of interconnection stations on said bock, each of said interconnection stations comprising a pair of pins secured transverse to said body member in said body member, said pair of pins projecting beyond one side of said body member and only one of said pair of pins projecting beyond the other side of said body member, conductors on both sides of said body member attached to selected ones of said pair of pins, said conductors being directed to locations spaced from said connector block, said pairs of pins forming an $m$ and $n$ matrix array on said one side of said body member and said ones of said pairs of pins forming an $m$ by $n/2$ matrix array on said other side of said body member, where $m$ is an integer equal to or greater than one and $n$ is an even integer equal to or greater than two, plus connector members including at least two recesses therein and electrical conductor means disposed within said recesses for selectively electrically interconnecting said pair of pins at said interconnection stations on said one side of said body member, each of said interconnection stations further comprising test pin members secured within said connector block body member, and test connection means disposed in the interior of said body member for electrically connecting the other of said pair of pins at said interconnection station to said test pin members.

20. A combination as in claim 19, wherein said test connection means further comprises a board having pins from a plurality of said stations passing therethrough, an electrical contacting clip member having a projecting portion thereon and a contact portion for engaging one of said connection pins, and means connecting said projecting portion of said contact clip member with said test pin member.

21. In combination in a connector block, a connector block body member, a plurality of interconnection stations on said block, each of said interconnection stations comprising a pair of pins secured transverse to said body member in said body member, said pair of pins projecting beyond one side of said body member, at least one of said pair of pins projecting beyond the other side of said body member, test pin members secured within said connector block body member, each of said test pin members being associated with only one of said interconnection stations for enabling selective testing of said interconnection stations, test connection means for electrically connecting selected ones of said pairs of pins at said interconnection stations to selected ones of said test pin members, at least one plug connector member including at least two recesses therein and electrical conductor means disposed within said recesses for selectively electrically interconnecting one of said pair of pins at one of said interconnection stations, said plug connector member having an inner face which is spaced a predetermined distance from said one side of said body member, and selected ones of said pins in selected ones of said pin pairs have wire-wraps on that portion thereof disposed in the space between said body member and said plug connector member.

22. In a telephone central office connector block, the improvement comprising a connector block body member, a plurality of interconnection stations on said block, each of said interconnection stations comprising a pair of pins secured transverse to said body member in said body member, said pair of pins projecting beyond one side of said body member and only one of said pair of pins projecting beyond the other side of said body member, conductors on both sides of said body member attached to selected ones of said pair of pins, said conductors being directed to locations spaced from said connector block, said pairs of pins forming an $m$ and $n$ matrix array on said one side of said body member and said ones of said pairs of pins forming an $m$ by $n/2$ matrix array on said other side of said body member, where $m$ is an integer equal to or greater than one and $n$ is an even integer equal to or greater than two, plug connector members including at least two recesses therein and electrical conductor means disposed within said recesses for selectively electrically interconnecting said pair of pins at said interconnection stations on said one side of said body member, each of said interconnection stations further comprising test pin members secured within said connector block body member, each of said test pin members being associated with only one of said interconnection stations for enabling selective testing of said interconnection stations, and test connection means disposed in the interior of said body member for electrically connecting the other of said pair of pins at said interconnection station to said test pin members.

* * * * *

UNITED STATES PATENT OFFICE
CERTIFICATE OF CORRECTION

Patent No. 4,012,096     Dated March 15, 1977

Inventor(s) Paul V. DeLuca et al.

It is certified that error appears in the above-identified patent and that said Letters Patent are hereby corrected as shown below:

Column 6, line 54, delete "the other" and substitute therefor -- one --.

Signed and Sealed this twelfth Day of July 1977

[SEAL]

Attest:

RUTH C. MASON
*Attesting Officer*

C. MARSHALL DANN
*Commissioner of Patents and Trademarks*